US005902382A

United States Patent [19]

[11] Patent Number: 5,902,382
[45] Date of Patent: May 11, 1999

Campain et al.

[54] DEGASSING SYSTEM FOR A HYDROCARBON DISPENSER

[75] Inventors: Jean-Pierre Campain, Clamart; Bernard Dumont, Arcueil; Gérald Marcy, L'Hay-les-Roses; Sylvain Janssen, Neuilly, all of France

[73] Assignee: Solutions Services Systems France S.A., Paris, France

[21] Appl. No.: 08/894,349

[22] PCT Filed: Feb. 13, 1996

[86] PCT No.: PCT/FR96/00235

§ 371 Date: Oct. 14, 1997

§ 102(e) Date: Oct. 14, 1997

[87] PCT Pub. No.: WO96/25358

PCT Pub. Date: Aug. 22, 1996

[30] Foreign Application Priority Data

Feb. 15, 1995 [FR] France .................................. 95/01715

[51] Int. Cl.[6] .................................................. B01D 19/00

[52] U.S. Cl. ................................ 96/161; 96/163; 96/166; 96/168; 96/169; 96/172

[58] Field of Search ............................ 95/241, 243, 259, 95/261; 96/155, 156, 158, 161, 163, 165, 166, 167, 169, 170, 168, 171, 172, 208, 209, 210, 211, 213, 216

[56] References Cited

U.S. PATENT DOCUMENTS

| | | | |
|---|---|---|---|
| 1,888,192 | 11/1932 | Winter | 96/163 |
| 1,920,066 | 7/1933 | DeLancey | 96/161 |
| 1,941,390 | 12/1933 | DeLancey | 96/161 |
| 1,957,910 | 5/1934 | Retsema | 96/161 |
| 1,962,631 | 6/1934 | Winter | 96/163 |
| 2,064,988 | 12/1936 | Risser | 96/163 |
| 2,194,843 | 3/1940 | Bechtold | 96/169 |
| 2,223,112 | 11/1940 | Lear | 96/169 |
| 2,275,355 | 3/1942 | Finken | 96/167 |
| 2,330,703 | 9/1943 | Grise | 96/169 |
| 4,799,940 | 1/1989 | Millikan | 95/261 |
| 4,978,374 | 12/1990 | Janssen et al. | 96/210 |

*Primary Examiner*—Duane S. Smith
*Attorney, Agent, or Firm*—Randall J. Knuth

[57] ABSTRACT

A degassing system for a hydrocarbon dispenser including a hydrocarbon circulating pump (12). The system includes a degassing assembly (16) having an inlet connected to the outlet of the pump, a degassed hydrocarbon outlet (90), a takeoff outlet (20) for taking off the hydrocarbon/gas mixture, a degassing vessel (24), and a duct (38, 60") for connecting the takeoff outlet to the degassing vessel. The end of the duct which opens out into the degassing vessel has an adjustable effective flow section. The system also includes a valve arrangement (110, 118) for modifying the effective flow section as a function of the gas content of the hydrocarbon.

3 Claims, 5 Drawing Sheets

DEGASSING SYSTEM FOR A HYDROCARBON DISPENSER

BACKGROUND OF THE INVENTION

The present invention relates to a degassing system for a hydrocarbon dispenser.

In hydrocarbon dispensers, it is known that it is necessary to degas the hydrocarbon in order to ensure that the volume of hydrocarbon delivered to a user does indeed correspond to hydrocarbon and not to a volume mixture of liquid hydrocarbon plus gas.

In European patent No. 0 357 513, a hydrocarbon dispenser is described that includes means for monitoring the gas content of the hydrocarbon. In that document, the hydrocarbon dispenser is provided with a vortex type degasser which is associated with detection means enabling hydrocarbon dispensing to be interrupted as soon as the gas content therein exceeds a predetermined value. Vortex degassers are commonly used in that type of installation. They consist in establishing a helical flow of liquid-and-gas mixture in an elongate cylindrical enclosure, in taking off the liquid-enriched fraction via a lateral tube, and in taking off a gas-enriched fraction via an axial tube.

Accompanying FIG. 1 is a diagram showing a degassing device as commonly used in hydrocarbon dispensers. In this figure, a pump 12 is shown causing hydrocarbon to pass from a storage tank 14 to a vortex degasser 16 which is constituted by an elongate cylindrical enclosure, as mentioned above. The hydrocarbon, possibly containing gas, is injected to a first end of the enclosure 16 by duct 18 in such a manner as to establish helical motion of the hydrocarbon inside the enclosure 16. Degassed hydrocarbon is taken via lateral duct 22 while a liquid fraction that is possibly enriched in gas is taken via axial duct 20. Exit tube 20 is connected to a duct 26 which is in turn connected to a degassing tank or vessel 24.

Looking at the device of FIG. 1, it will be understood that one of the problems associated with such a system is that in the most usual situation of the gas content being very low, the axial takeoff tube 20 is in fact going to take off a non-negligible quantity of hydrocarbon, possibly containing very little gas. It will be understood that this hydrocarbon which is transferred to the degassing vessel reduces the effective efficiency of the installation since this hydrocarbon fraction must be recycled to the inlet of the pump 12 after spending a length of time in the vessel 24.

In contrast, it will be understood that when, accidentally, the hydrocarbon happens to have a high gas content, it is necessary to provide a takeoff tube 20 of diameter that is sufficient to take off effectively the entire gas-filled hydrocarbon fraction.

Also known, from U.S. Pat. No. 2,779,503, is a degassing system of the type shown in FIG. 1, in which the end of the duct opening out in the degassing vessel carries a non-return valve of effective through section that is adjustable by the action of a float resting on the liquid contained in the vessel. When the liquid content is large in the liquid/gas mixture taken off at the outlet from the degassing enclosure, the vessel fills with liquid, thus having the effect of raising the level of the liquid in the degassing vessel, and thus closing the section of the valve. Conversely, if the mixture taken off is rich in gas, then the level of liquid in the vessel remains substantially constant and the valve remains open to pass gas.

However, it can be observed that the above-known degassing system has a response time that is relatively long since when the liquid/gas mixture becomes enriched in liquid it is necessary to allow enough liquid to pour pointlessly into the degassing vessel to cause the liquid level to rise far enough to cause the valve to move through its entire stroke from its open position to its closed position.

SUMMARY OF THE INVENTION

To remedy the above drawback, the invention proposes a degassing system for a hydrocarbon dispenser having a pump for making hydrocarbon flow, said system comprising a degassing assembly having an inlet connected to the outlet of the pump, and a degassed hydrocarbon outlet, and a takeoff outlet for taking off a hydrocarbon/gas mixture, a degassing vessel, and duct-forming means for connecting said takeoff outlet to said degassing vessel, the end of said duct-forming means opening out into said degassing vessel having an effective flow section that is adjustable, the system being remarkable in that it further includes pressure means for modifying said effective flow section as a function of the gas content of the hydrocarbon in the degassing assembly.

It will be understood that because of this disposition of the invention, when the gas content is very low, hydrocarbon takeoff is kept low by reducing the effective flow section of the duct-forming means. In contrast, when the gas content is high, a high flow section is indeed conserved, thereby making it possible to take off the gas effectively and consequently to degas the hydrocarbon efficiently. In addition, the transition between one effective flow section and another takes place with substantially no inertia since pressure variations in the degassing assembly are transmitted almost instantaneously to the pressure means.

Finally, it will be observed that in the above-mentioned American patent, valve control is performed a posteriori and downstream, since it is necessary for liquid to flow into the degassing vessel in order to close the valve, whereas in the invention, control of the pressure means takes place a priori and upstream, with the degassing system becoming effective immediately.

In a first embodiment of the invention, said duct-forming means comprise a single duct, and said pressure means comprise, at the end of the duct opening cut into said degassing vessel, Venturi-forming means provided with a throat, said throat being immersed in the hydrocarbon contained in said degassing vessel, the outlet of said Venturi being disposed above the hydrocarbon level and being provided with a constriction, said throat of the Venturi-forming means being provided with an opening opening out into the hydrocarbon of said degassing vessel, whereby a fraction of the mixture flowing along said duct when the gas content of the hydrocarbon is high also exits via said opening.

In a second embodiment of the invention, said duct-forming means comprise first and second ducts, the open end of the first duct opens out into said degassing vessel, and said pressure means comprise a shutter whereby said second duct opens out into said degassing vessel, and means for controlling closure of said shutter when the gas content in the hydrocarbon is less than a predetermined value.

In a third embodiment of the invention, said duct-forming means comprise a first duct having a first end connected to said takeoff outlet and having its other end connected to Venturi-forming means having a throat and an outlet provided with a constriction located above the hydrocarbon level in said degassing vessel, a second duct having a first end connected to the takeoff outlet and having its other end opening out into said degassing vessel above the free surface level of the hydrocarbon, and said pressure means comprise a moving shutter for said duct and control means for said shutter such that the shutter is open when the pressure at the throat of the Venturi-forming means is high and such that said shutter is closed otherwise.

BRIEF DESCRIPTION OF THE DRAWINGS

Other characteristics and advantages of the present invention appear more clearly on reading the following description of various embodiments of the invention given as non-limiting examples. The description refers to the accompanying drawings, in which.

DETAILED DESCRIPTION OF THE INVENTION

Figure 2A:
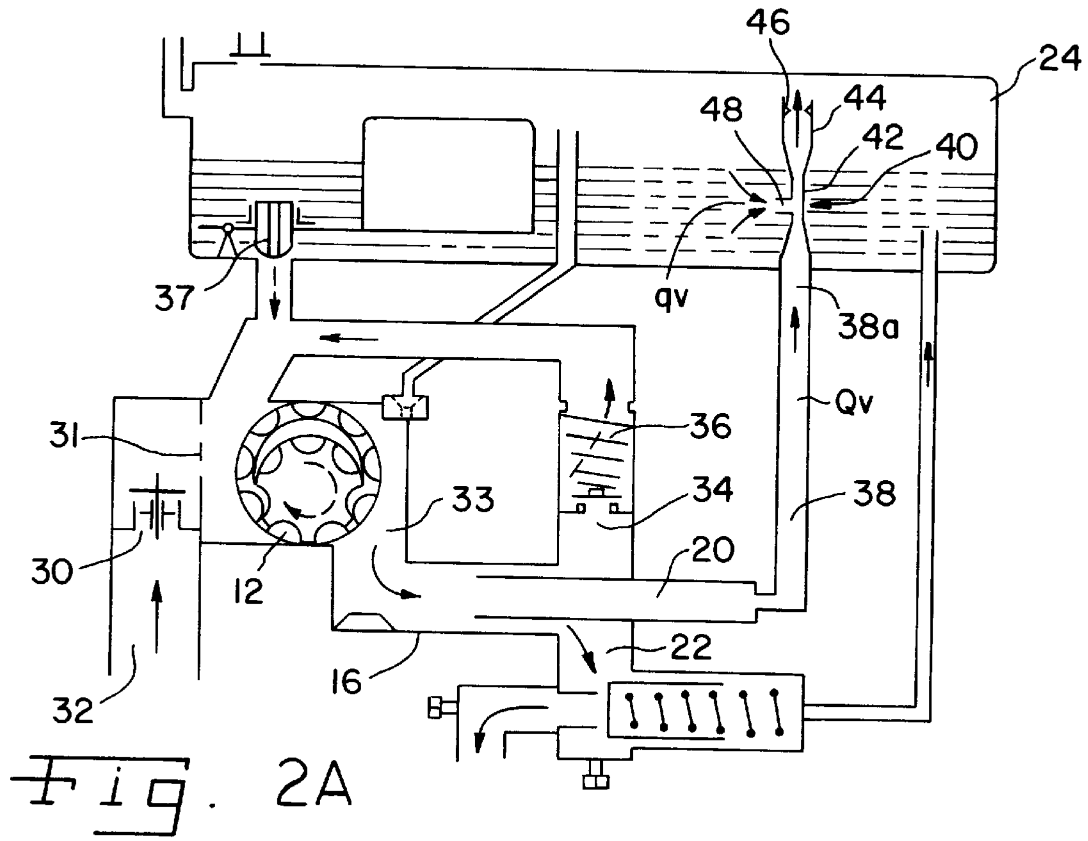
FIG. 2*a* is a vertical section through a first embodiment of the degassing system.

A first embodiment of the degassing system is initially described, with reference to FIG. 2*a*. In FIG. 2*a*, there can be seen the pump 12 with its non-return valve 30 and its filter 31 putting into circulation the hydrocarbon which arrives via duct 32 from the storage tank. The outlet 33 of the pump is connected to the vortex degassing enclosure 16 and there can be seen its axial takeoff tube 20 and also the tube 22 for extracting degassed hydrocarbon. The figure also shows a recycling circuit 34 provided with a valve 36 which enables excess hydrocarbon flow to be reinserted to the inlet of the pump. There can also be seen in this figure the degassing vessel 24 which includes a valve 37 enabling hydrocarbon to be recycled to the inlet of the pump after it has been degassed in the degassing vessel 24. This structure is well known in hydrocarbon dispensers for the purpose of degassing delivered hydrocarbon.

According to the invention, the takeoff duct 20 is connected to a duct 38 which opens out into the degassing vessel 24. More precisely, the end 38*a* of the duct 38 is connected to a Venturi device 40, which Venturi device has a throat 42 and an outlet 44 opening out above the free liquid level of hydrocarbon in the vessel 24. This outlet 44 is preferably provided with a flow rate constriction 46. The throat 42 of the Venturi 40 is provided with an opening 48 located beneath the regulated liquid level of hydrocarbon in the vessel 24. According to the invention, the opening 48 formed in the throat 42 of the Venturi makes it possible to modify the effective flow section of the gas/liquid mixture flowing along the duct 38 as a function of its gas content.

The Venturi 40 with its orifice 48 operates as follows. It is known that a Venturi or Herschel type nozzle is capable of creating a large amount of suction in its throat when it is passing a fluid flow $Q_V$ of pure liquid fed by upstream pressure P and opening out to atmospheric pressure $P_O$. The absolute pressure in the throat can be close to zero, being limited solely by the vapor pressure of the fluid. This pressure p at the throat can still remain very low even if a constriction 46 is placed upstream from the suction generator: the orifice 48 formed in the throat thus enables liquid to be sucked in from the vessel.

This sucked-in liquid flow rate $q_V$ mixes with the flow rate $Q_V$ delivered by the pressure P, and there exists a flow rate $q_V+Q_V$ to atmospheric pressure. The headloss at the constriction 46 increases, going from a value proportional to $Q_V^2$ to a value proportional to $(Q_V+q_V)^2$ which has the effect of slowing down the flow rate $Q_V$ for given pressure P. Things are quite different when gas is mixed in with the fluid flow $Q_V$ travelling along the nozzle.

Under such circumstances, the relative pressure p at the throat of the nozzle increases rapidly and becomes strongly positive and exceeds atmospheric pressure $P_O$: the flow rate $Q_V$ reverses and fluid containing air escapes from the throat. Degassing can then take place not only downstream from the nozzle, but also through the lateral opening in the throat 48, thereby significantly increasing the effectiveness with which gas is evacuated. In other words, the effective outlet section is reduced when the gas content is zero or very low. As the gas content increases, the effective flow section also increases.

The degassing installation shown in FIG. 2*a* operates as follows: when there is no air in the hydrocarbon, a flow rate $Q_V$ leaves via the duct 38 and passes through the Venturi 40 before passing into the degassing vessel. In the absence of any gas, the suction formed at the throat of the Venturi sucks in a liquid flow rate $q_V$, with the mixture $Q_V+q_V$ being expelled into the degassing vessel after passing through the constriction 46. The effective flow rate reaching the degassing vessel is limited to $Q_V$ since the flow rate $q_V$ does no more than circulate locally by entering and then leaving the nozzle. The nozzle acts as a circulating pump of flow rate $q_V$ and for this purpose it needs to provide work. Its internal resistance increases and its feed flow rate $Q_V$ is reduced.

In contrast, when the flow rate $Q_V$ in the duct 38 has a higher gas content, then the pressure in the throat 42 of the Venturi rises and a flow rate of mixture is expelled not only from the end 44 of the Venturi, but also from the opening 48. Degassing is made much more effective by increasing the exhaust section and decreasing the internal resistance of the Venturi 40.

Figure 2D:
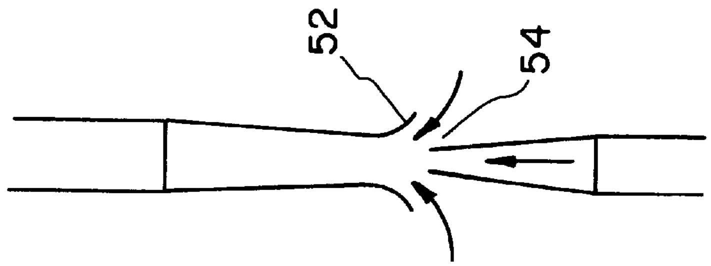
FIGS. 2*b*, 2*c*, and 2*d* are detail views showing various embodiments of the Venturi-forming means.
Figure 2C:
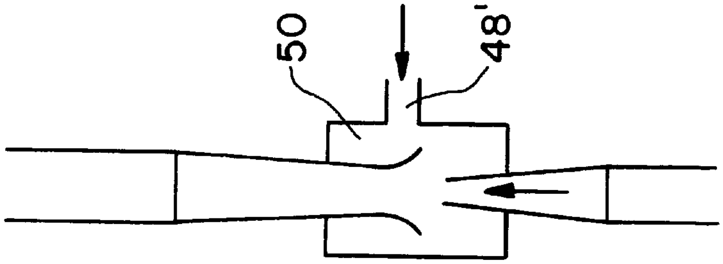
Figure 2B:
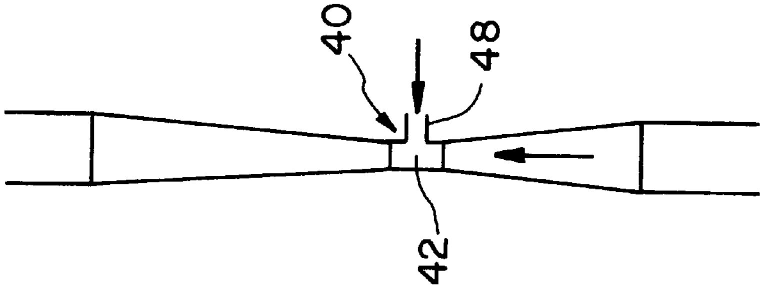

FIG. 2*b* shows in greater detail the shape of a conventional Venturi 40 which, in accordance with the invention, is provided with an orifice 48.

In FIG. 2*c*, there is shown a Venturi device of the type comprising a nozzle followed by a Golaz funnel with an annular vacuum chamber 50 into which there opens an orifice 48' that is the equipment of the orifice 48. This disposition is strictly equivalent to that of FIG. 2*b*.

FIG. 2*d* shows another equivalent of the Venturi device, this equivalent being constituted by an injector type nozzle 52 analogous to that used for mixing gases that are to be fed to burners. The annular opening 54 performs exactly the same function as the orifice 48 or the orifice 48'.

Throughout the description, it should be understood that the term "Venturi device" covers not only a Venturi proper as shown in FIG. 2*b*, but also nozzle devices of the kinds shown in FIGS. 2*c* and 2*d*.

Figure 3:
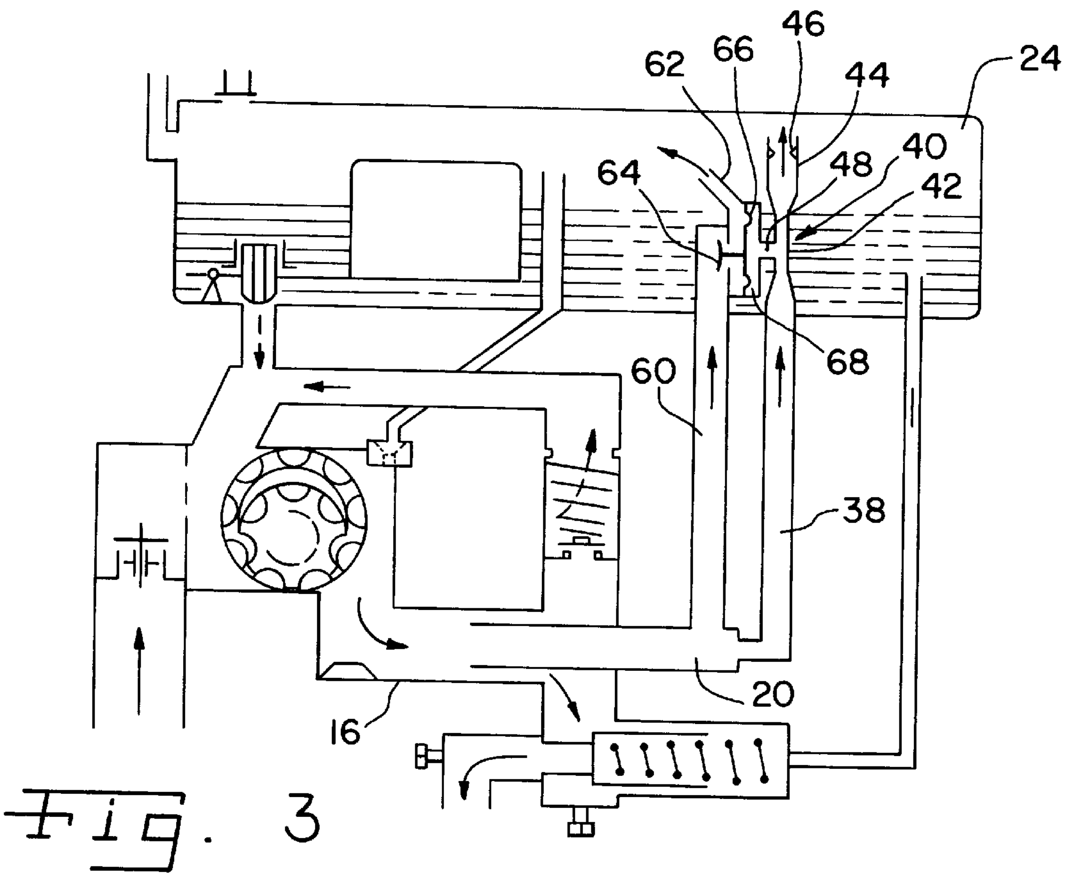
FIG. 3 shows a second embodiment of the degassing system.

With reference now to FIG. 3, a second embodiment of the degassing device is described. In this embodiment, the axial takeoff tube 20 is still connected to the tube 38 which is provided at its end with a Venturi device 40, the throat 42 of the Venturi device being provided with an orifice 48. In this embodiment, the axial takeoff tube 20 is also connected to a second duct 60 whose outlet 62 opens out into the degassing vessel and can be closed by a moving valve system 64 controlled by a deformable membrane 66. The valve control chamber 68 defined by the deformable membrane 66 is directly connected to the opening 48 formed in the throat 42 of the Venturi 40. This embodiment operates as follows. The outlet 44 of the Venturi 40 is provided with a constriction 46 which makes it possible to limit the flow rate through the Venturi to a low value of approximately 1 to 2 liters per minute, for example. If the flow rate $Q_V$ flowing along the duct 38 has no gas, then the throat 42 of the Venturi is at low pressure and the deformable membrane 66 is held in a position such that the moving shutter 64 is closed. The duct 60 is therefore inactive. In contrast, when the duct 38 carries a flow $Q_V$ containing gas, the throat 42 of the Venturi is at a relatively high pressure which acts on the deformable membrane 66 to open the shutter 64. The duct 66 is thus made active and the total effective flow section is increased.

Figure 4:
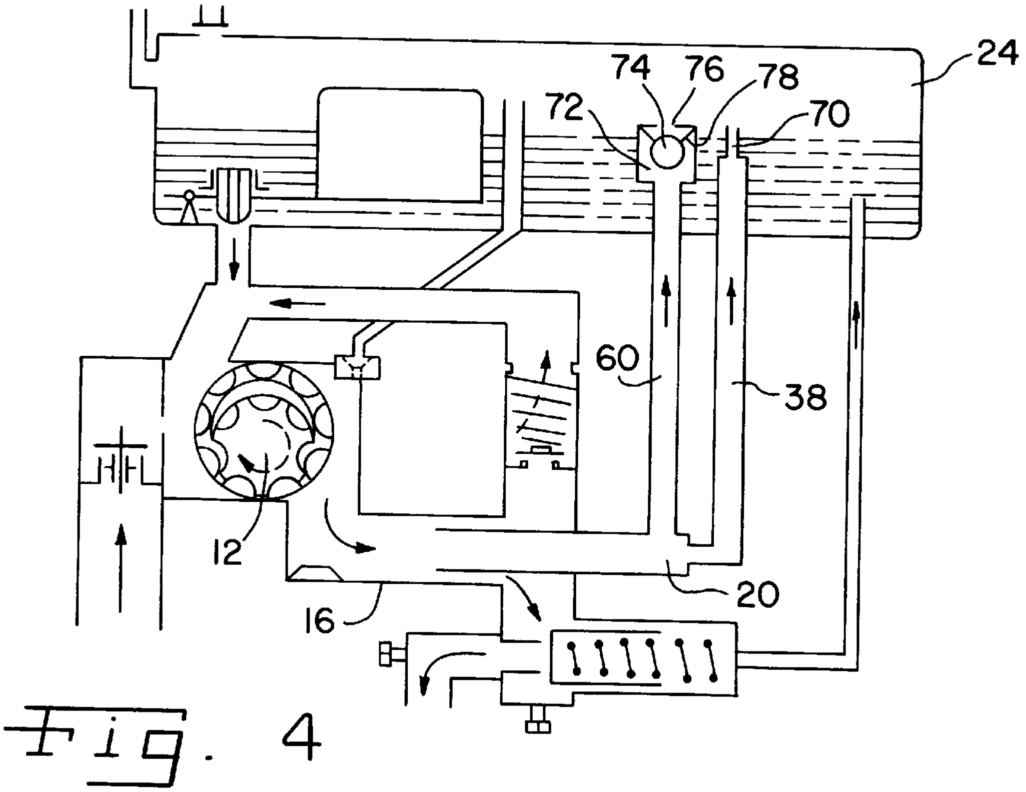
FIG. 4 shows a third embodiment of the degassing system.

With reference now to FIG. 4, a third embodiment of the degassing device is described. This embodiment is based on the observation that the presence of air or gas in the hydrocarbon sucked up by the pump generally leads to a decrease in the pressure with which the fuel is dispensed, thereby having the side effect of reducing degassing capacity. This embodiment takes advantage of this drop in the pressure of the hydrocarbon when it contains air. In this embodiment, there is still the first duct 38 connected to the axial takeoff tube 20, with the tube 38 terminating in a constriction 70 located above the liquid level of the hydrocarbon. The second duct 60 also connects the takeoff tube 20 to a chamber 72 fitted with a ball valve comprising a ball 74, a seat 76, and a return spring 78 tending to move the ball off its seat. When the installation is put under pressure, a jet $Q'_V$ is generated in the duct 60, pushing the ball 74 against its seat 76, and compressing the spring 78. Flow along the duct 60 is thus interrupted. If a large amount of gas is sucked in, thereby causing the pressure to drop beneath a certain value, and in particular the pressure in the duct 60, then the spring 76 moves the ball away from its seat, thus enabling a permanent degassing flow to be established in the duct 60 in addition to the flow in the duct 38. This considerably improves degassing preformed by the vortex degasser 16.

Figure 5:
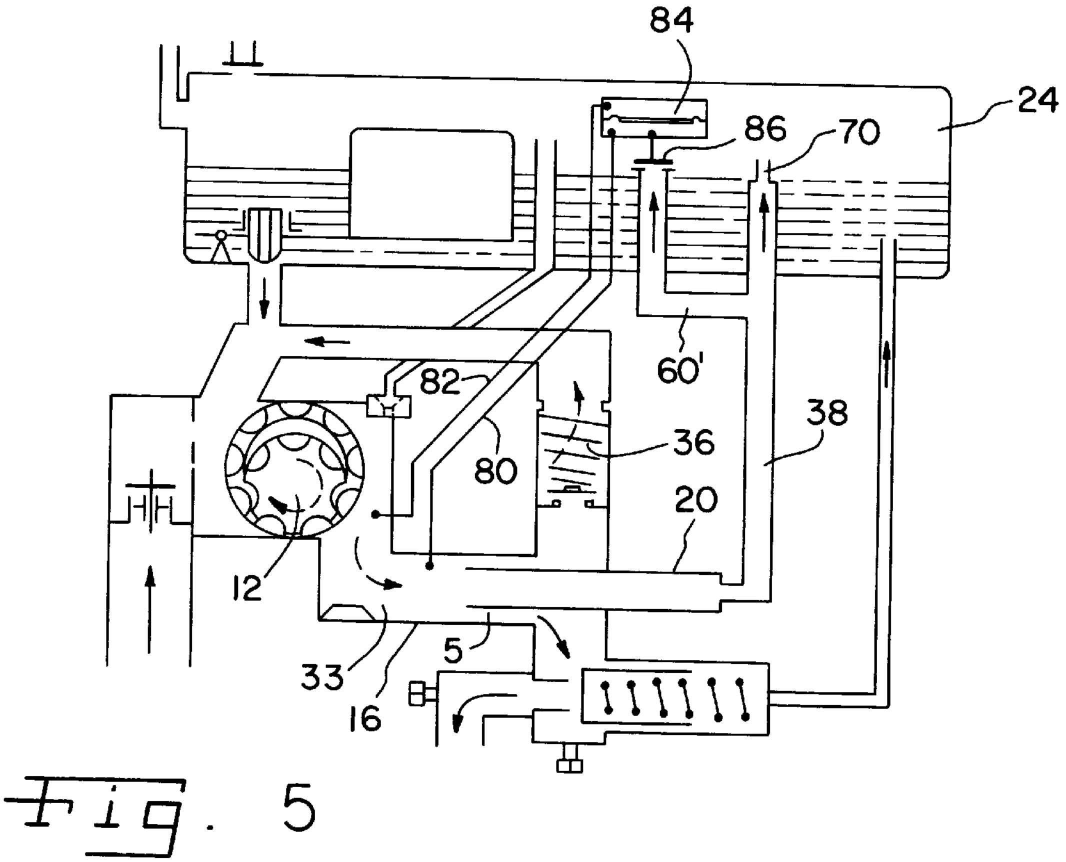
FIG. 5 is a vertical section through a fourth embodiment of the degassing system.

Another method of increasing the effectiveness of degassing is shown in FIG. 5. Advantage is taken of the almost constant flow rate generated by the pump 12 when there is no air in the fuel, giving rise to a headloss $\Delta p$ that varies little at the outlet of the pump 33 at a location where the fluid is subjected to a sudden change in flow profile. This occurs, in particular, at the inlet to the vortex degasser 16 which causes the fluid to enter the tube 5 tangentially for centrifuging to take place.

The constant flow rate Q of the pump 12 is ensured at all times because of the regulation provided by the return valve 36.

Since headloss $\Delta p$ is proportional to the product of fluid density $\rho$ multiplied by the square of its flow rate Q, $\Delta p = K\rho Q^2$, any intake of air causes the density $\rho$ to fall off quickly and also the flow rate Q, thus leading to a rapid drop in $\Delta p$. This variation $\Delta p$ generated across two pressure takeoffs situated on either side of the inlet 33 of the vortex tube 16, for example, is directed via two ducts 80 and 82 to a membrane sensor 84 carrying a valve member 86. The valve 86 can vary the flow section of the auxiliary degassing channel 60' through which a flow $Q'_V$ can be added to the continuous flow $Q_V$ flowing along the main channel 38 which is provided at its end 14 with a constriction 70 that greatly limits $Q_V$.

In the absence of air, the high value of $\Delta p$ closes the valve 86 and $Q'_V=0$. From a predetermined value of air sucked into the pump and passing through the vortex inlet 33, the valve 86 is opened and $Q'_V \neq 0$, thereby increasing the effective flow sections for exhausting gas via the channel 38.

In all of the above, steps have been made to increase degassing effectiveness of hydrocarbon dispensers by creating additional flow section for exhausting air before the substance delivered to the customer begins to contain a quantity of gas that exceeds the limits laid down by regulations. It is also possible to provide for auxiliary degassing only when gas becomes manifest in fuel that has been subjected to insufficient degassing due to the separator elements becoming saturated. It is thus possible to analyze the fluid that has been conveyed to the outlet 22, 34 of the degasser 16 and which cannot legally contain more than 0.5% or 1% gas, depending on the nature of the fuel. This analysis can be performed, for example, in the zone 90 upstream from the valve 36 in the recycling duct 34 which also constitutes the outlet duct 22 for taking "degassed" hydrocarbon from the vortex degasser 16.

Figure 1:
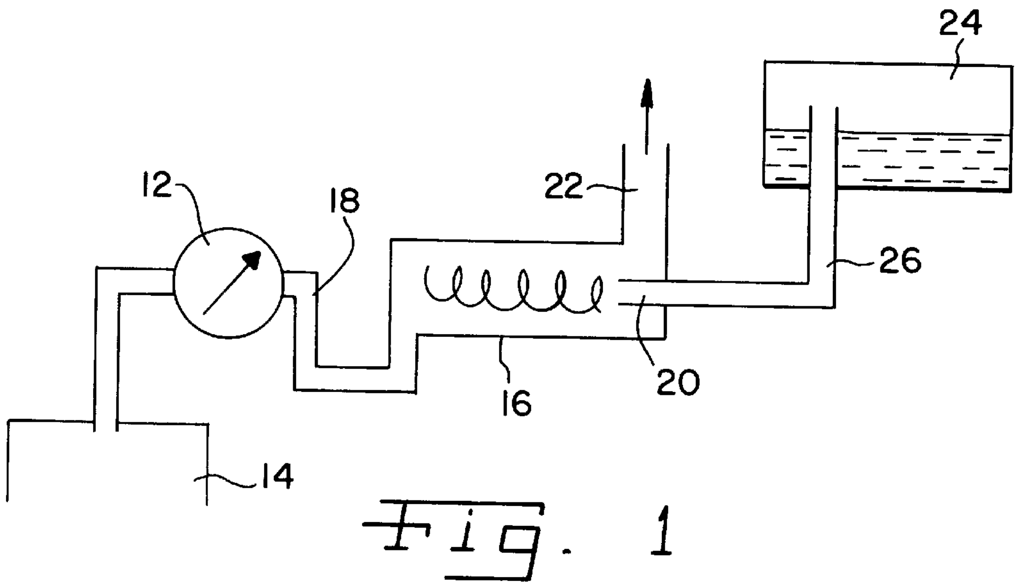
FIG. 1, described above, shows a known degassing system for a hydrocarbon dispenser.
Figure 7B:
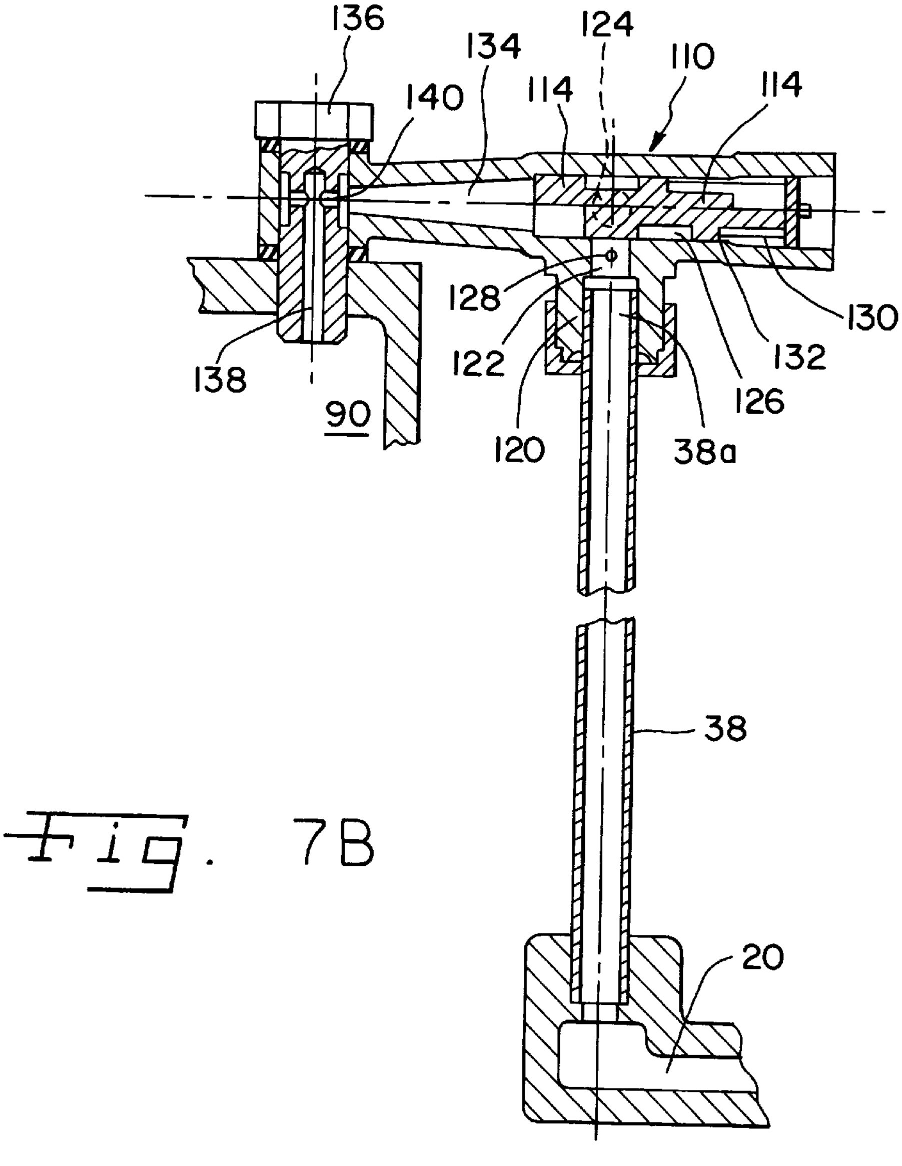
FIG. 7*b* is a view of a detail of FIG. 7*a*.
Figure 6:
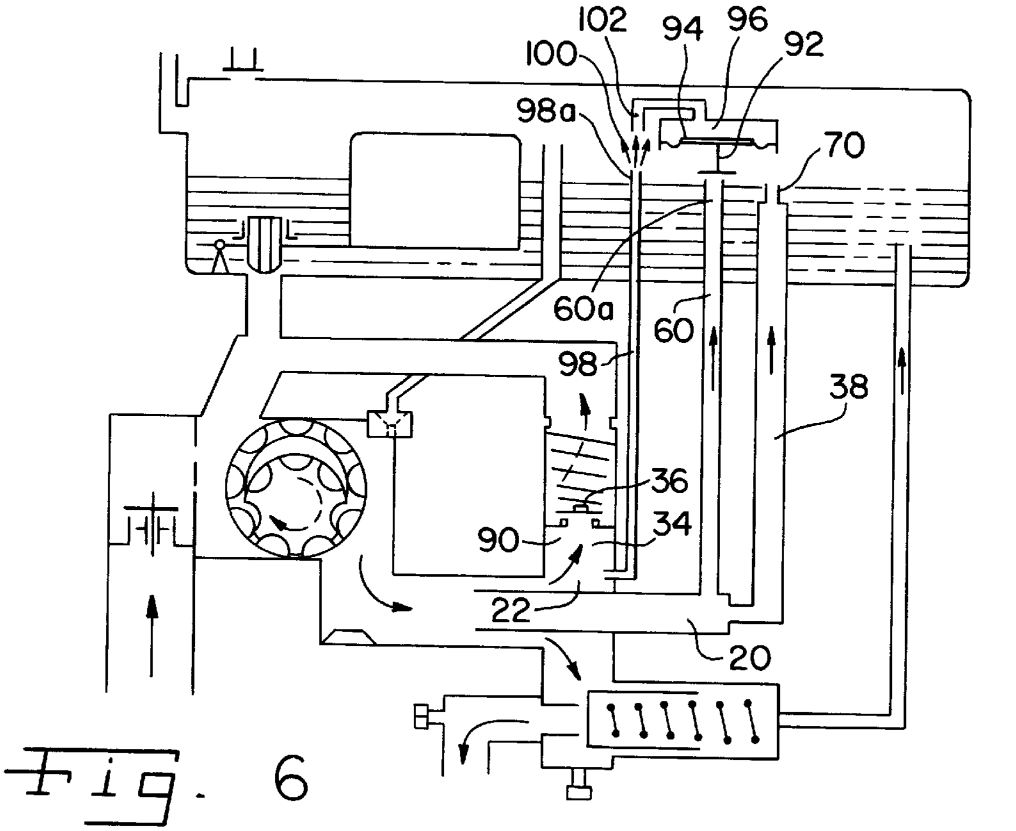
FIG. 6 shows a fifth embodiment of the degassing system.
Figure 7A:
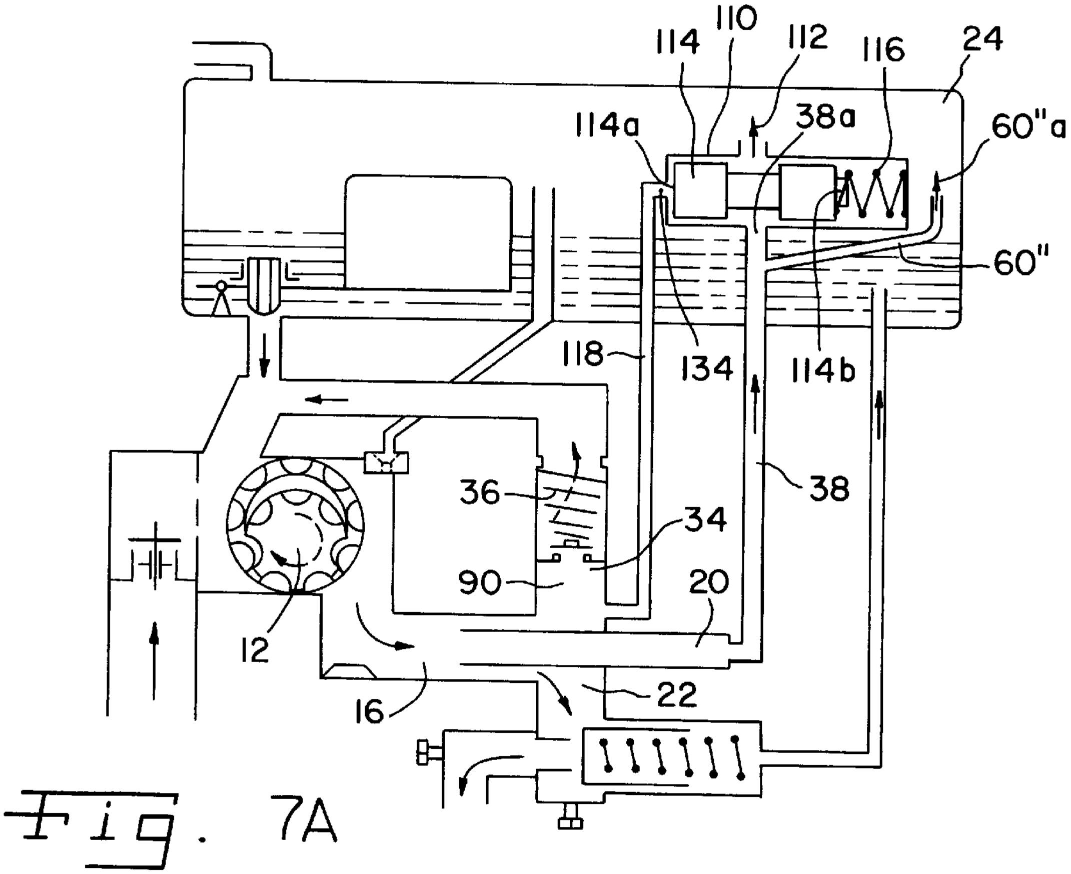
FIG. 7*a* is an overall vertical section view of a sixth embodiment of the degassing system.

FIGS. 6 and 7*a* show two embodiments of a degassing system based on this principle.

In the embodiment of FIG. 6, the axial takeoff duct 20 is connected firstly to the duct 38 provided with its constriction 70, and secondly to the auxiliary duct 60 whose end 60*a* is provided with a valve 92 controlled by movement of a deformable membrane 94. The position of the membrane 94 and thus the state of the valve 92 is controlled by the pressure which obtains in a control chamber 96.

In the zone 90, a duct 98 allows a permanent flow to take place towards the degassing vessel 24. The end 98*a* of the duct 98 is disposed above the liquid level of hydrocarbon in the vessel 24 and is directed upwards to form a fluid jet 100. This jet 100 is directed towards a recovery nozzle 102 connected to the control chamber 96. This nozzle generates a dynamic pressure which is applied to the membrane 94. The valve 92 opens when the dynamic pressure of the jet becomes insufficient, allowing an additional degassing flow to take place via the auxiliary duct 60.

In the embodiment of FIG. 7*a*, the duct 38 connected to the axial takeoff duct 20 of the vortex degasser 16 includes a small-section parallel duct 60" whose end 60"*a* opens out into the degassing vessel 24. The end 38*a* of the duct 38 is connected to a slide valve 110. The valve 110 has an outlet 112 located in the vessel 24 above the liquid level of hydrocarbon in the vessel. The slide 114 of the valve 110 is controlled by pressure applied to its end face 114*a*, with its other end face 114*b* being subjected to the action of a return spring 116. A duct 118 puts the zone 90 of the outlet 22, 34 of the degasser 16 into permanent communication with the control chamber 134 of the slide valve 110 defined by the end 114*a* of the slide. Thus, the pressure which obtains in the zone 90 is permanently applied to the end face 114*a* of the valve slide.

When this pressure is high in the zone 90, the slide 114 is pushed back and compresses the spring 116. In this position, the slide 114 interrupts communication between the inlet 38*a* and the outlet 112 of the valve. Only the duct 60" allows liquid to escape into the vessel 24. In contrast, when the pressure in the zone 90 is lower, then the slide 114 occupies the position shown in FIG. 7*a* and the liquid/gas mixture can also leave via the valve 110, thereby naturally increasing the effective degassing flow section.

FIG. 7*b* shows a preferred embodiment of a portion of the apparatus shown diagrammatically in FIG. 7*a*. The valve 110 is constituted by a body 120 having an inlet opening 122 connected to the end 38*a* of the duct 38, and it also has an outlet opening 124. The slide 114 has an annular opening 126 making it possible in certain positions of the slide to put the inlet into communication with the outlet. An orifice 128 opening out directly into the vessel 24 constitutes the equivalent of the duct 60". In the body 120 of the valve, there is mounted a return spring 130 which acts on a shoulder 132 of the slide. The control chamber 134 of the slide is directly connected to the zone 90 by a screw 136 having bores 138 and 140. The screw 136 constitutes the equivalent of the duct 118 in FIG. 7*a*.

We claim:

1. A degassing system for a hydrocarbon dispenser having a pump (12) for making hydrocarbon flow, said system comprising a degassing assembly (16) having an inlet (33) connected to the outlet of the pump, and a degassed hydrocarbon outlet (22), and a takeoff outlet (20) for taking off a hydrocarbon/gas mixture, a degassing vessel (24), and duct-forming means (38, 60, 60') for connecting said takeoff outlet (20) to said degassing vessel, the system being characterized in that said duct-forming means includes a first duct (38) and a second duct (60, 60') both opening out into said degassing vessel (24), the opening out end of said second duct (60, 60') having a flow section that is adjustable, and in that said degassing system further includes adjusting means (64, 74, 84, 92) capable of modifying said flow section as a function of the gas content of the hydrocarbon so that said section increases when the gas content increases, wherein said adjusting means comprise a shutter (64, 74, 86) whereby said second duct (60) opens out into said degassing vessel, and means (66, 72, 84) for controlling closure of said shutter when the gas content in the hydrocarbon is less than a predetermined value, and wherein said adjusting means comprise, at the end of the second duct (60) opening out into said degassing vessel (24), a rated ball valve (72, 74, 76) such that in the absence of gas in the hydrocarbon, the valve is closed and, for a gas content exceeding a predetermined value, said valve is open under the effect of variations in the pressure of the fluid flowing along the second duct (60).

2. A degassing system for a hydrocarbon dispenser having a pump (12) for making hydrocarbon flow, said system comprising a degassing assembly (16) having an inlet (33) connected to the outlet of the pump, and a degassed hydrocarbon outlet (22), and a takeoff outlet (20) for taking off a hydrocarbon/gas mixture, a degassing vessel (24), and duct-forming means (38, 60, 60') for connecting said takeoff outlet (20) to said degassing vessel, the system being characterized in that said duct-forming means includes a first duct (38) and a second duct (60, 60') both opening out into said degassing vessel (24), the opening out end of said second duct (60, 60') having a flow section that is adjustable, and in that said degassing system further includes adjusting means (64, 74, 84, 92) capable of modifying said flow section as a function of the gas content of the hydrocarbon so that said section increases when the gas content increases, wherein said adjusting means comprise a shutter (64, 74, 86) whereby said second duct (60) opens out into said degassing vessel, and means (66, 72, 84) for controlling closure of said shutter when the gas content in the hydrocarbon is less than a predetermined value, and wherein the outlet of said pump (12) includes constrictions (33) on either side of which a pressure difference is established that is representative of the gas content of the hydrocarbon at the outlet from said pump, the system being characterized in that said adjusting means comprise, at the end of the second duct (60') opening out into said degassing vessel (24), a valve (86) controlled by the displacements of a differential pressure sensor (84) and means (80, 82) for applying the pressure difference that exists on either side of said constrictions to said differential pressure sensor.

3. A system according to claim 2, characterized in that said differential pressure sensor is a deformable membrane (84) which is subjected to said pressure difference.

* * * * *